(12) United States Patent
Yanari (10) Patent No.: US 6,412,947 B2
(45) Date of Patent: Jul. 2, 2002

(54) PROGRESSIVE-POWER MULTIFOCAL LENS

(75) Inventor: Mitsuhiro Yanari, Tokyo (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 0 days.

(21) Appl. No.: 09/850,297

(22) Filed: May 8, 2001

(30) Foreign Application Priority Data

May 10, 2000 (JP) ........................................ 2000-137731

(51) Int. Cl.$^7$ ................................................. G02C 7/06
(52) U.S. Cl. ........................................ 351/169; 351/177
(58) Field of Search ................................ 351/168, 169, 351/170, 171, 172, 177

(56) References Cited

U.S. PATENT DOCUMENTS

| | | | |
|---|---|---|---|
| 5,137,343 A | 8/1992 | Kelch et al. | 351/169 |
| 5,557,348 A | 9/1996 | Umeda et al. | 351/169 |
| 5,726,734 A | 3/1998 | Winthrop | 351/169 |

FOREIGN PATENT DOCUMENTS

| JP | 8-136868 | 5/1996 |
|---|---|---|

*Primary Examiner*—Scott J. Sugarman
(74) *Attorney, Agent, or Firm*—Miles & Stockbridge P.C.

(57) ABSTRACT

A progressive-power multifocal lens whose far-vision portion dioptric power is minus, which has, along a principal meridian curve, a far-vision correction portion, a near-vision correction portion, a progressive-power portion between the far-vision correction portion and the near-vision correction portion. Where a base curve is represented by BC; a mean surface refracting power at an arbitrary point on the progressive-power multifocal surface, located at a distance of x (mm) from a far-vision portion eyepoint in the horizontal direction in wear of spectacles and located at a distance of y (mm) from the far-vision portion eyepoint in the vertical direction in wear of spectacles, by P (x,y) (diopter); and a mean surface additional refracting power obtained by subtracting the base curve BC from the mean surface refracting power, by $\Delta P(x,y)\{=P(x,y)-BC\}$ (diopter);

the lens fulfills the condition of $$\Delta P(x,y) > 0 \qquad (1)$$

in a region which satisfies $15 \leq (x^2+y^2)^{1/2} \leq 20$ in the far-vision correction portion.

2 Claims, 6 Drawing Sheets

PROGRESSIVE-POWER MULTIFOCAL LENS

This application claims the benefit of Japanese Patent application No. 2000-137731 which is hereby incorporated by reference.

BACKGROUND OF THE INVENTION

1. Field of the Invention

This invention relates to a progressive-power multifocal lens, and more particularly to a progressive-power multifocal lens used to assist the ability of accommodation of the eye.

2. Related Background Art

Single-vision lenses, bifocal lenses or progressive-power multifocal lenses are used to correct presbyopia. Of these lenses, in particular, the progressive-power multifocal lenses make it unnecessary to put on and put off spectacles between those for far vision and those for near vision, and also have an external appearance having no boundary line like that of bifocal lenses. Accordingly, in recent years, there is a reasonably increasing demand for the progressive-power multifocal lenses.

The progressive-power multifocal lenses are spectacle lenses for assisting the ability of accommodation of the eye when it grows weak to make the near vision difficult. The progressive-power multifocal lenses commonly have a far-vision correction portion and a near-vision correction portion which are positioned at the upper part and the lower part, respectively, of a lens at wear of spectacles (hereinafter, the former is often "far-vision portion" and the latter often "near-vision portion"), and a progressive-power portion where the refracting power changes continuously, positioned between the both portions (hereinafter often "intermediate portion"). Incidentally, in the present specification, terms "upper part", "lower part", "horizontal" and "vertical" describe the positional relationship of a lens at wear of spectacles. For example, the lower part of the far-vision portion is meant to be the portion close to the intermediate portion within the region of the far-vision portion.

Figure 1:
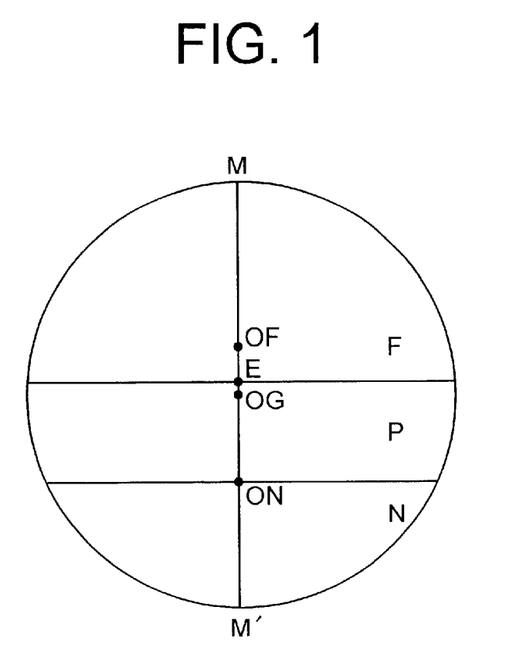
FIG. 1 illustrates an outline of regional sections of a progressive-power multifocal lens which are designed symmetrically.

FIG. 1 illustrates an outline of regional sections of a progressive-power multifocal lens which are designed symmetrically. The progressive-power multifocal lens shown in FIG. 1 has a far-vision portion F and a near-vision portion N which are positioned at the upper part and the lower part, respectively, of the lens at wear of spectacles, and an intermediate portion P where the refracting power changes continuously, positioned between the both portions. With regard to the shape of lens surface, a line of intersection M-M' where a cross section along the meridian which runs vertically through substantially the middle of lens surface from the upper part to the lower part intersects with the object-side (the side opposite to the eye) lens surface is used as a reference line for representing specification such as additional power of lenses. In the progressive-power multifocal lenses thus designed symmetrically, the center of far-vision portion, OF, of the far-vision portion F, the far-vision eyepoint E which is a fitting point, the geometric center of lens surface, OG, and the center of near-vision portion, ON, are positioned on the center line M-M' serving as a reference.

Figure 2:
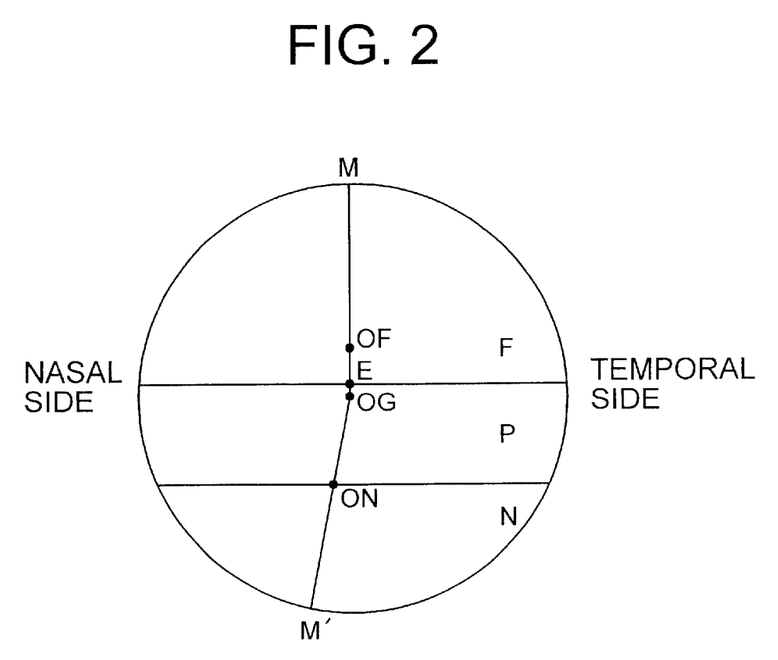
FIG. 2 illustrates an outline of regional sections of a progressive-power multifocal lens which are designed asymmetrically, taking account of the fact that the center of near-vision portion, ON, of a lens comes close to the nasal side in wear of spectacles.

FIG. 2 illustrates an outline of regional sections of a progressive-power multifocal lens which are designed asymmetrically, taking account of the fact that the center of near-vision portion, ON, of a lens comes close to the nasal side in wear of spectacles (this lens is hereinafter "asymmetrical progressive-power multifocal lens"). In the asymmetrical progressive-power multifocal lens shown in FIG. 2, too, the center line M-M' consisting of a line of intersection where a cross section which passes along the center of far-vision portion, OF, of the far-vision portion F, the far-vision eyepoint E, the geometric center of lens surface, OG, and the center of near-vision portion, ON, intersects with the object-side lens surface is used as a reference line.

In the present specification, these reference lines are generically called "principal meridian curve". The center of the far-vision portion F and the center of the near-vision portion are positions used as references when lens dioptric power is measured. A distance (far-vision) portion measurement reference point is called the center of far-vision portion, OF, and a near-portion measurement reference point is called the center of near-vision portion, ON. Also, mean surface refracting power at the the center of far-vision portion, OF, is regarded as a base curve, and mean dioptric power in respect of a light ray which passes through the center of far-vision portion, OF, is regarded as reference mean dioptric power at the far-vision portion (hereinafter "far-vision portion dioptric power"). Usually, the center of near-vision portion, ON, is in agreement with the near-vision eyepoint. Note, however, that the center of far-vision portion and the center of near-vision portion which are herein referred to are meant not to be geometric centers in the respective portions but to be functional centers in the measurement of lenses and at wear of spectacles.

In the present specification, mean surface refracting power (hereinafter often "surface refracting power") and surface astigmatism are expressed by the following equations (a) and (b), respectively, where a maximum main curvature at an arbitrary point on the progressive-power multifocal surface is represented by $\psi max$, a minimum main curvature by $\psi min$, and a refractive index of a lens by n.

Surface refracting power=$(\psi max + \psi min) \times (n-1)/2$     (a)

Surface astigmatism=$(\psi max - \psi min) \times (n-1)$     (b)

In the present specification, mean dioptric power and astigmatism are expressed by the following equations (c) and (d), respectively, where maximum dioptric power in respect of a light ray having passed through an arbitrary point on the progressive-power multifocal surface is represented by Dmax, and minimum dioptric power by Dmin.

Mean dioptric power=$(Dmax+Dmin)/2$     (c)

Astigmatism=$(Dmax-Dmin)$     (d)

In the present specification, mean surface additional refracting power (hereinafter often "surface additional refracting power") refers to surface refracting power found by subtracting the base curve from the surface refracting power at an arbitrary point on the progressive-power multifocal surface. Also, mean additional dioptric power (hereinafter often "additional dioptric power") refers to dioptric power found by subtracting far-vision portion dioptric power from the mean dioptric power (hereinafter often "dioptric power") in respect of a light ray which passes through an arbitrary point on the progressive-power multifocal surface.

In the progressive-power multifocal lens, a plus surface refracting power (or dioptric power) is continuously added toward the center of near-vision portion, ON, from the center of far-vision portion, OF, on the principal meridian curve M-M' which passes substantially the geometric center of the lens. The value found by subtracting the surface refracting power (or dioptric power) of the center of far-vision portion, OF, from the surface refracting power (or dioptric power) of the center of near-vision portion, ON, at which this surface additional refracting power (or additional dioptric power) comes to be maximum is called additional power of the progressive-power multifocal lens. In the progressive-power multifocal lens, what is ideal is a lens having distinct vision in a wide range and less crooked or distorted view in all regions of the far-vision portion F, the intermediate portion P and the near-vision portion N.

Now, in conventional progressive-power multifocal lenses, discussion has been made chiefly on optical characteristics of the progressive-power multifocal surface (refracting surface). More specifically, the performance of progressive-power multifocal lenses has often been evaluated on, e.g., their distribution of surface refracting power (or distribution of surface additional refracting power) and distribution of astigmatism at the progressive-power multifocal surface. Accordingly, design engineers have chiefly aimed at attaining distribution of surface refracting power adapted to purposes, widely ensuring the portion having astigmatism not greater than a stated value, i.e., the region called a distinct-vision range and also making the maximum value of astigmatism as small as possible taking account of any deformed, crooked or distorted view, at the progressive-power multifocal surface.

In actual spectacle lenses, however, the optical characteristics of the progressive-power multifocal surfaces of lenses do not necessarily coincide with optical characteristics the lenses may have when those who wear spectacles use the lenses. Accordingly, in recent years, in order to more improve optical performance perceived when those who wear spectacles use lenses actually, it has come to make evaluation of not only optical characteristics of the progressive-power multifocal surface but also optical performance in a state closer to the state where spectacles are worn, i.e., to make evaluation of optical performance on the basis of light rays having passed through the lenses.

In general, the relationship between lens curvature and lens dioptric power that may make minimum the astigmatism of light rays having passed through a lens can be obtained from, e.g., Tscherning's Ellipse. That is, it is well known that, as curvature of each surface of a lens, combination of optimum curvature obtained by the Tscherning's Ellipse may be selected so that any astigmatism can be kept from occurring at the border of the lens. However, when any combination of optimum curvature obtained by the Tscherning's Ellipse is used, the base curve may have so large curvature that the lens also tends to have a large thickness. Accordingly, in progressive-power multifocal lenses available in recent years, it has become prevailing that curvature which is smaller than the curvature obtained from the combination of optimum curvature is selected as the base curve.

Hence, between the distribution of surface refracting power or distribution of astigmatism at the progressive-power multifocal surface and the distribution of dioptric power or astigmatism in respect of light rays having passed through the lens to enter the eye of those who wear spectacles, what shows an equal tendency is limited, in many cases, to the portion where light rays coming from an object is incident at angles almost perpendicular to the lens surface, i.e., the portion of the optical axis of the lens and the vicinity thereof, such as the fitting point of the lens and the vicinity thereof. In contrast thereto, light rays which come through positions distant from the optical axis of the lens and enter the eye of those who wear spectacles is incident obliquely to the lens surface. Hence, it follows that light rays which pass through the lens at its positions where the surface refracting power of the lens surface is equal to the base curve and the astigmatism is substantially zero also stand deviated in dioptric power from the far-vision portion dioptric power serving as a reference when they pass through the lens, and enter the eye of those who wear spectacles, in the state where astigmatism has occurred. This tendency varies depending on curvature, center thickness and so forth of prescribed surfaces of the lens and moreover becomes greater at positions coming nearer to the border of the lens. Accordingly, it becomes necessary to design progressive-power multifocal surface which has been made optimum taking account of various conditions such as base curve, power and so forth of the lens.

Recently, in progressive-power multifocal lenses, techniques are proposed in which optical performance is evaluated on the basis of such light rays. In such prior art, however, a portion having an astigmatism not greater than a stated level, stated specifically, a region where the astigmatism is not greater than 0.50 diopter is defined to be a distinct-vision range, and discussion has almost been made only on how to ensure this distinct vision in a wide range. More specifically, in the prior art, discussion is little made on how to make optimum the distribution of dioptric power or distribution of additional dioptric power.

In order to widen the distinct-vision range in wear of spectacles, it is important and necessary to control the astigmatism to a low level. Especially with regard to the far-vision portion, it can not be said to be sufficient if the distinct-vision range is defined only by the level of astigmatism. More specifically, in a region where the dioptric power stands deviated greatly from any prescribed far-vision portion dioptric power, a view may blur because of a dioptric-power error even if the astigmatism is not greater than the stated level commonly defined to be the distinct-vision range (stated specifically, the region where the astigmatism is not greater than 0.50 diopter). Hence, those who wear spectacles can not distinctly see any objects at a long distance. The influence due to the dioptric-power error at the far-vision portion for seeing objects at a long distance is greater than any influence due to a dioptric-power error at the near-vision portion for seeing objects at a short distance. Accordingly, it is more greatly important for the far-vision portion to be designed taking account of any dioptric-power error, deviated from the stated far-vision portion dioptric power, than for the near-vision portion.

SUMMARY OF THE INVENTION

The present invention was made taking account of the above problems. Accordingly, an object of the present invention is to provide, in progressive-power multifocal lenses whose far-vision portion dioptric power is minus, a progressive-power multifocal lens in which the level of deviation of dioptric power, i.e., the dioptric-power error, from far-vision portion dioptric power at the far-vision portion can be controlled to a small value over a wide range and the optical performance in wear of spectacles can be set well.

Another object of the present invention is to provide a progressive-power multifocal lens that may less cause any blur of views due to the dioptric-power error and can widely ensure the distinct-vision range.

To achieve the above objects, the present invention provides a progressive-power multifocal lens whose far-vision portion dioptric power is minus, which comprises, along a principal meridian curve which divides the refracting surface of the lens into a nasal-side portion and a temporal-side portion;

a far-vision correction portion which deals with a long distance;

a near-vision correction portion which deals with a short distance; and a progressive-power portion which connects the refracting power continuously between the far-vision correction portion and the near-vision correction portion at the surfaces of the both portions;

wherein;

where a base curve is represented by BC; a mean surface refracting power at an arbitrary point on the progressive-power multifocal surface, located at a distance of x (mm) from a far-vision portion eyepoint in the horizontal direction in wear of spectacles and located at a distance of y (mm) from the far-vision portion eyepoint in the vertical direction in wear of spectacles, by P (x,y) (diopter); and a mean surface additional refracting power obtained by subtracting the base curve BC from the mean surface refracting power, by $\Delta P(x,y)\{=P(x,y)-BC\}$ (diopter);

the lens fulfills the condition of $$\Delta P(x,y)<0 \quad (1)$$

in a region which satisfies $15 \leq (x^2+y^2)^{1/2} \leq 20$ in the far-vision correction portion.

According to a preferred embodiment of the present invention, the lens fulfills the condition of $$0.005 \leq \Delta P(x,y)/(x^2+y^2)^{1/2} \leq 0.120 \quad (2)$$

in a region which satisfies $15 \leq (x^2+y^2)^{1/2} \leq 20$ in the far-vision correction portion.

DESCRIPTION OF THE PREFERRED EMBODIMENTS

Commonly available progressive-power multifocal lenses have a plurality of base curves within the manufacture range of from a plus dioptric power to a minus dioptric power. Ideally speaking, it is most preferable for those who wear spectacles if the lens can have progressive-power multifocal surface which is optimum for each far-vision portion dioptric power. However, taking account of circumstances of manufacture and advantages on cost, identical progressive-power multifocal surfaces are usually used in common within the range of stated values of far-vision portion dioptric power.

In the case of progressive-power multifocal lenses whose far-vision portion dioptric power is minus, they commonly have a smaller curvature of the base curve than that of progressive-power multifocal lenses whose far-vision portion dioptric power is plus, and also have a base curve curvature which becomes smaller as the manufacture range comes to be of minus dioptric power. Accordingly, in order to attain a good optical performance in respect of transmitted light rays, it is necessary to make the progressive-power multifocal surface optimum in conformity with the manufacture range and the curvature of the base curve.

In the case of such progressive-power multifocal lenses whose far-vision portion dioptric power is minus, where the surface additional refracting power distribution on the progressive-power multifocal surface is so designed as to become substantially equal to the base curve, a dioptric power which is more minus to the far-vision portion dioptric power at the border of the far-vision portion tends to be added to the additional dioptric power distribution in respect of transmitted light rays. As the result, regions of negative over-correction are made up at the border of the far-vision portion to cause problems such that the lens has a narrow distinct-vision range, has a narrow region for the dioptric power which should originally be added to the intermediate portion or near-vision portion, and has a narrow intermediate portion or near-vision portion in practical use.

Accordingly, with regard to the additional dioptric power distribution of transmitted light rays at the far-vision portion, in order to make it substantially equal to the far-vision portion dioptric power over a wide region so as to fulfill the conditions of the distinct-vision range, it is necessary to add a plus dioptric power to the border of the far-vision portion. This has been found to be achievable by adding to the far-vision portion a minus surface refracting power under certain conditions for the base curve. Thus, in the progressive-power multifocal lens of the present invention, a wide distinct-vision range can be attained over the whole far-vision portion by imparting a plus surface additional refracting power to a far-vision portion distant by 15 mm or more from the far-vision portion eyepoint.

More specifically, in the present invention, where a base curve is represented by BC; a mean surface refracting power at an arbitrary point on the progressive-power multifocal surface, located at a distance of x (mm) from a far-vision portion eyepoint in the horizontal direction in wear of spectacles and located at a distance of y (mm) from the far-vision portion eyepoint in the vertical direction in wear of spectacles, by P (x,y) (diopter); and a mean surface additional refracting power obtained by subtracting the base curve BC from the mean surface refracting power, by $\Delta P(x,y)\{=P(x,y)-BC\}$ (diopter);

the lens fulfills the condition of the following condition (1) in a region which satisfies $15 \leq (x^2+y^2)^{1/2} \leq 20$ in the far-vision portion.

$$\Delta P(x,y)>0 \quad (1)$$

Here, the lower limit of the condition (1) may preferably be set to be 0.10.

In the present invention, in order to ensure a wider distinct-vision range at the far-vision portion, the lens may preferably fulfill the following condition (2) in a region which satisfies $15 \leq (x^2+y^2)^{1/2} \leq 20$ in the far-vision correction portion.

$$0.005 \leq \Delta P(x,y)/(x^2+y^2)^{1/2} \leq 0.120 \qquad (2)$$

If the lens has a value smaller than the lower-limit value of the condition (2), the additional dioptric power may insufficiently be corrected to make broad the negative correction portion in the far-vision portion. As the result, the lens may have a narrow distinct-vision range, undesirably. If on the other hand the lens has a value greater than the upper-limit value of the condition (2), the additional dioptric power may excessively be corrected to make narrow the region through which objects can be seen at a long distance in the far-vision portion, resulting in a narrow distinct-vision range undesirably. In the condition (2), the lower-limit value and the upper-limit value may preferably be set to be 0.010 and 0.100, respectively. Also, in the condition (2), the lower-limit value and the upper-limit value may more preferably be set to be 0.010 and 0.080, respectively.

In the present invention, with regard to the distance in each direction in wear of spectacles (in the state where spectacles are worn), numerals with positive signs are used for the upper part, and numerals with negative signs for the lower part, in the case of vertical direction in wear of spectacles. In the case of horizontal direction in wear of spectacles, numerals with positive signs are used for the temporal side, and numerals with negative signs for the nasal side.

In order to ensure a wide distinct-vision range at the far-vision portion and at the same time make optical characteristics substantially equal to each other at wear of spectacles in respect of the dioptric power distribution and the astigmatism distribution with respect to the respective base curves, the above conditions (1) and (2) in the present invention may preferably be fulfilled in a region which is distant by 15 mm or more from the far-vision portion eyepoint; the region being expressed as at least $15 \leq (x^2+y^2)^{1/2}$. In a region extending 15 mm inward in radius from the far-vision portion eyepoint E, expressed as $(x^2+y^2)^{1/2} < 15$ (mm), the angle at which light rays entering the lens is incident on the lens surface (i.e., the angle of incidence) is close to 90 degrees. Hence, any change in the dioptric power distribution and any difference in the astigmatism may hardly occur because of changes in the base curves, thus such a region may be less affected even where the conditions in the present invention are not fulfilled. Accordingly, where lenses are designed attaching importance more to the measurement of their prism level and dioptric power and to the optimization of dioptric power distribution and astigmatism distribution at the intermediate portion and the near-vision portion, the object of the present invention can be achieved even if the conditions in the present invention are not necessarily fulfilled in such a region. However, it is more preferable to fulfill the conditions of the present invention in a region of $12 \leq (x^2+y^2)^{1/2}$ (mm), and more preferably to fulfill the conditions in a region of $10 \leq (x^2+y^2)^{1/2}$ (mm).

According to "Eye Physiology" published by Igaku Shoin, compiled by Akira Hagiwara, pp.325–328, the range of photopic vision which can be made only by eye movement in the state the head is set stationary is called a field of fixation. Also, a field of fixation which is accompanied by supplemental movement of the head is defined to be an actual field of fixation. In the present invention, taking note of this point, it is considered suitable to use the actual field of fixation when a common level of movement of visual axis is taken into account where those who wear spectacles use glass lenses. More specifically, in the region of the progressive-power multifocal surface corresponding to the actual field of fixation, of the progressive-power multifocal lens according to the present invention, a wide distinct-vision range can be attained over the whole far-vision portion as long as the conditions of the present invention are fulfilled.

In general, the movement of visual axis in seeing objects at a long distance by the use of progressive-power multifocal lenses is limited to the upper part and the right-and-left horizontal direction. Here, according to the above publication, an experiment has proved that the actual field of fixation in both eyes in sound eyes is substantially in a semicircle having an extent of about 50 degrees in the right-and-left horizontal direction. Although there is some difference depending on the center thickness and base curve curvature of the lens, a rotational angle 40 degrees of the visual axis corresponds to about 20 mm in coordinates on the progressive-power multifocal surface of the far-vision portion in wear of spectacles, and a rotational angle 50 degrees of the visual axis corresponds to about 30 mm.

Accordingly, in order to attain a wide distinct-vision range over the whole far-vision portion in actual use, the conditions of the present invention may preferably be fulfilled in the region having the shape of a substantial semicircle or a shape close to a semicircle, having, on the basis of the far-vision portion eyepoint, an extent which provides $0 \leq y \leq 20$ (mm) in the vertical direction (the upward), and in the horizontal direction an extent which provides $0 \leq |x| \leq 20$ (mm), and more preferably $0 \leq |x| \leq 30$ (mm), in the region of at least one of the temporal side and the nasal side with respect to the principal meridian curve.

However, as stated previously, even in the region having the shape of a substantial semicircle or a shape close to a semicircle, the conditions in the present invention need not necessarily be fulfilled in the region expressed as $(x^2+y^2)^{1/2} < 15$ (mm). Also, in order to attain a wideer distinct-vision range in the upward region of the far-vision portion of the lens, it is preferable to fulfill the conditions of the present invention also in a region of $20 < y \leq 30$ (mm). In this case, the conditions in the present invention may preferably be fulfilled in a range of $15 \leq (x^2+y^2)^{1/2} \leq 30$ (mm) in the region of at least one of the temporal side and the nasal side with respect to the principal meridian curve.

Meanwhile, a region of $30 < y$ (mm) is a region seldom used in practice. Hence, the lens is less affected even when the conditions in the present invention are not fulfilled in this region, and may have less problem in practical use. Accordingly, where a lens is designed taking account of the balance of optical performance of the whole progressive-power multifocal lens, the object of the present invention can be achieved even when the conditions in the present invention are not necessarily be fulfilled in the region of $30 < y$ (mm).

The conditions in the present invention may preferably be further fulfilled in a region of $30 < |x|$ (mm), too. However, this region is a region seldom used in practice, and hence the lens is less affected even when the conditions in the present invention are not fulfilled in this region, and may have less problem in practical use. Accordingly, where a lens is designed taking account of the balance of optical performance of the whole progressive-power multifocal lens, the object of the present invention can be achieved even when the conditions in the present invention are not necessarily be fulfilled in the region of $30 < |x|$ (mm).

With regard to regions in the horizontal direction of the lens, regions actually used may vary depending on various conditions such as eye distance of those who wear spectacles, decentration of lenses and shapes of frames. Usually, where spectacle lenses are framed in a spectacle frame, they are often framed in a state decentered on the nasal side. In such a case, the region actually used is narrower on the nasal side than on the temporal side with respect to the principal meridian curve as a boarder. Hence, the lens may have less problem in practical use even when the distinct-vision range at the far-vision portion is set narrower in the nasal-side portion than in the temporal-side portion. Accordingly, where a lens is designed taking account of the balance of optical performance of the whole progressive-power multifocal lens and uses of the lens, the breadth of the region satisfying the conditions of the present invention may also be set asymmetrical with respect to the principal meridian curve.

Embodiments of the present invention are described below with reference to the accompanying drawings.

Figure 3:
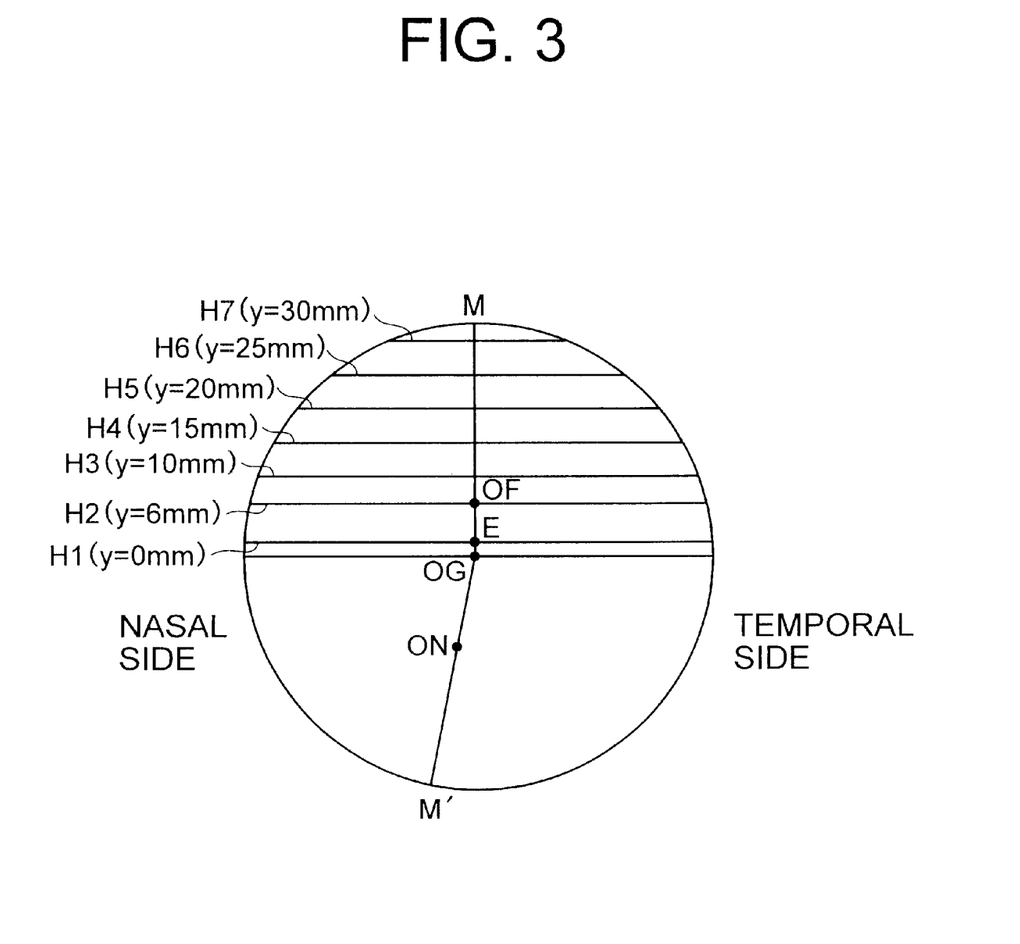
FIG. 3 is a view showing a progressive-power multifocal lens for the left eye according to an embodiment of the present invention, and illustrates horizontal section curves shown by lines of intersection of planes vertical to the principal meridian curve with refracting surfaces.

FIG. 3 is a view showing a progressive-power multifocal lens for the left eye according to an embodiment of the present invention, and illustrates horizontal section curves shown by lines of intersection of planes vertical to the principal meridian curve with refracting surfaces. In the present embodiment, the surface additional refracting power distribution of each progressive-power multifocal lens is shown along such horizontal section curves.

In FIG. 3, H1 is a horizontal section curve passing through the far-vision portion eyepoint E, and H2 is a horizontal section curve passing through the center of far-vision portion, OF. Also, H3 to H7 show horizontal section curves at 10 mm, 15 mm, 20 mm, 25 mm and 30 mm, respectively, in distance (height) in the vertical direction from the far-vision portion eyepoint E. In the present embodiment, the present invention is described below taking note of this progressive-power multifocal lens for the left eye. A progressive-power multifocal lens for the right eye stands likewise.

Figure 4:
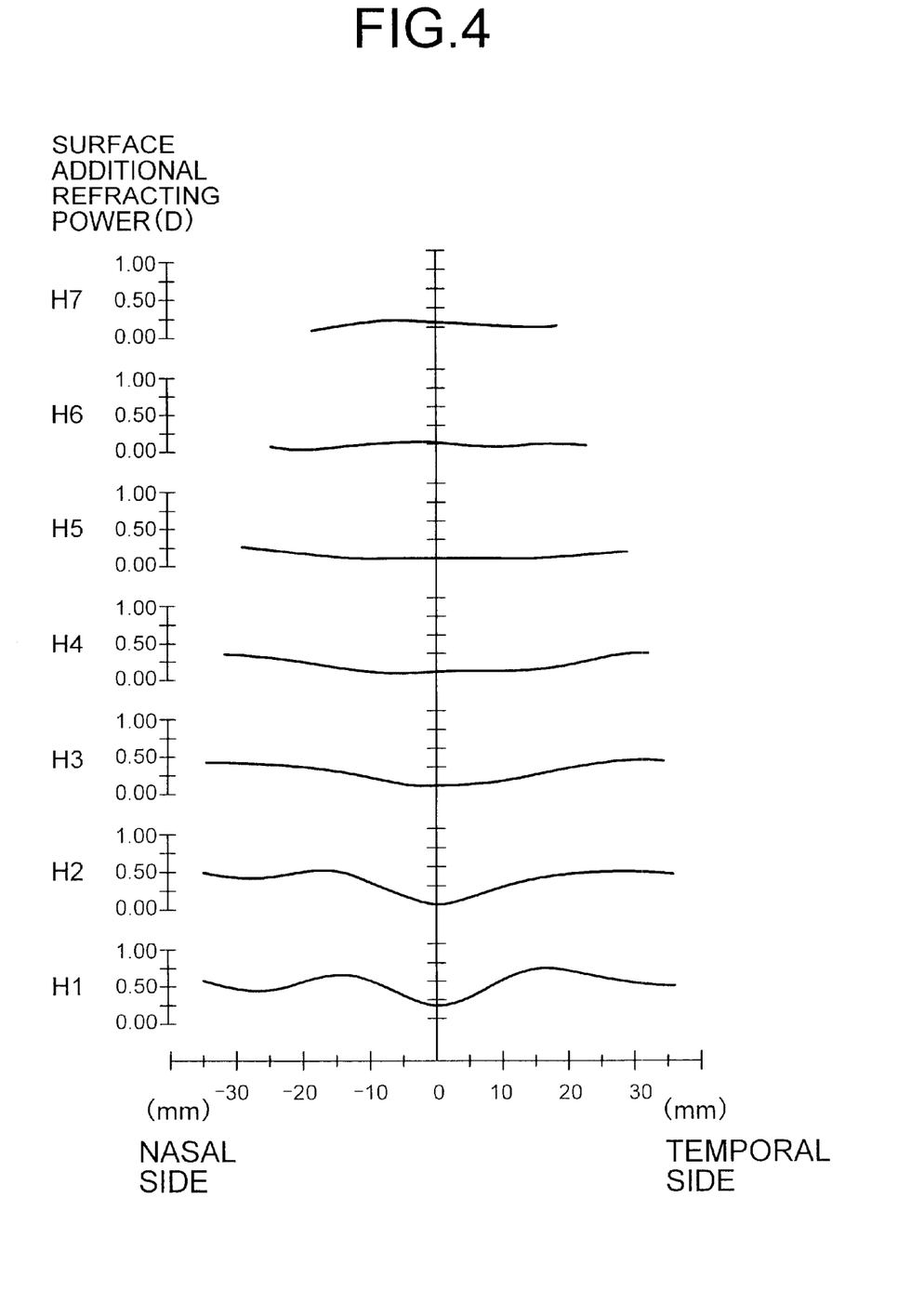
FIG. 4 shows surface additional refracting power distribution along horizontal section curves H1 to H7 at the far-vision portion of a progressive-power multifocal lens used as a comparative example for the embodiment of the present invention.

FIG. 4 shows surface additional refracting power distribution along horizontal section curves H1 to H7 at the far-vision portion of a progressive-power multifocal lens used as a comparative example for the embodiment of the present invention. In FIG. 4, the abscissa presents distance x (mm) in the horizontal direction from the principal meridian curve in wear of spectacles The distance x in the horizontal direction has numerals with positive signs on the temporal side and numerals with negative signs on the nasal side. Also, the surface additional refracting power along the horizontal section curves H1 to H7 is indicated in units D (diopter). As stated later, in the progressive-power multifocal lens according to such a comparative example according to the prior art, the surface refracting power at the far-vision portion is so designed as to be substantially equal to the base curve.

The progressive-power multifocal lens according to the comparative example has an external diameter φ of 70 mm, a base curve BC of 2.00 diopters, a far-vision portion dioptric power Df of −2.50 diopter, an additional power Ad of 2.00 diopters and a lens refractive index ne of 1.67, where the far-vision portion eyepoint E is positioned 2 mm upward from the geometrical center OG of the lens, and the center of far-vision portion, OF, is positioned 8 mm upward from the geometrical center OG of the lens.

As can be seen from FIG. 4, in the progressive-power multifocal lens according to the comparative example, the surface additional refracting power stands substantially zero in the greater part of its far-vision portion. In other words, the surface refracting power in the greater part of the far-vision portion is set substantially equal to the base curve.

Figure 5:
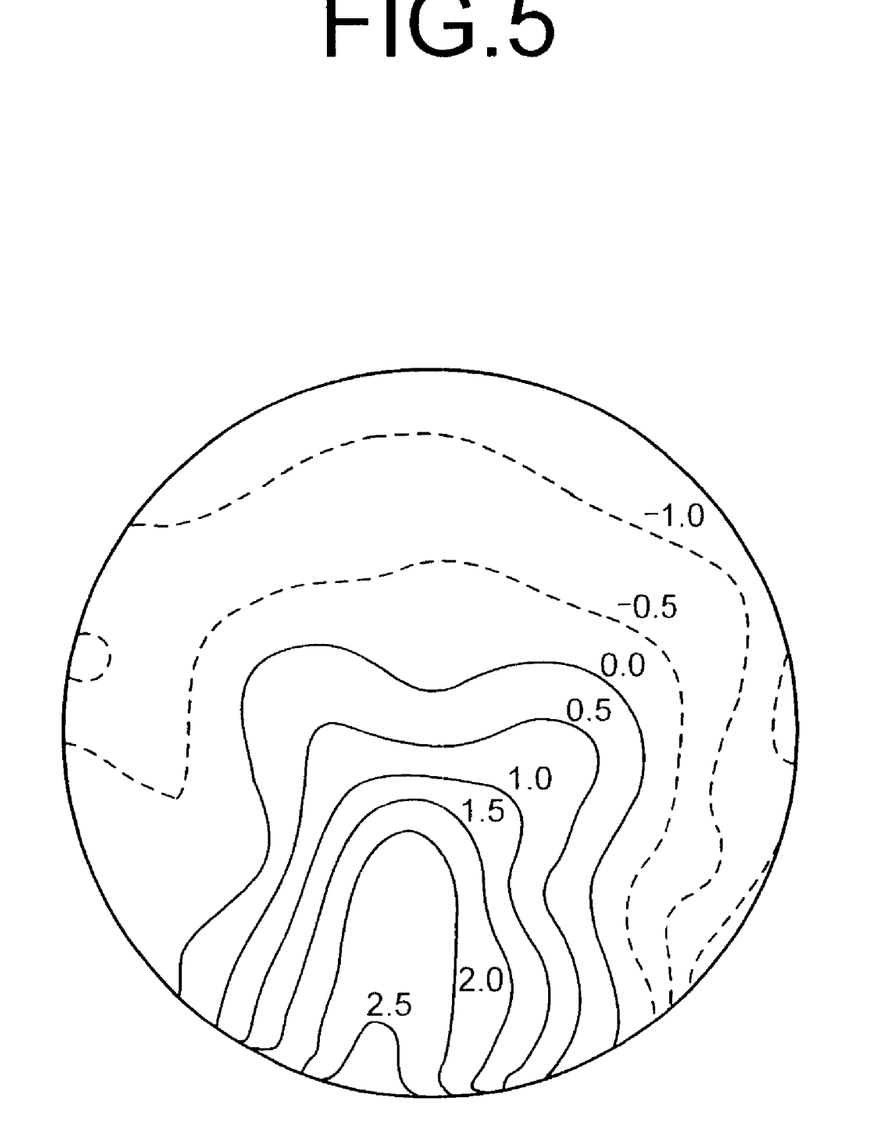
FIG. 5 shows surface additional dioptric power distribution in respect of light rays passing through a progressive-power multifocal lens according to the comparative example.

FIG. 5 shows surface additional dioptric power distribution in respect of light rays passing through a progressive-power multifocal lens according to the comparative example. As can be seen from FIG. 5, in the progressive-power multifocal lens according to the comparative example, regions in which the absolute values of the additional dioptric power at the far-vision portion are not greater than 0.50 diopter are limited to narrow regions near to the far-vision portion eyepoint and the center of far-vision portion because regions of negative over-correction extend in the greater part of the far-vision portion. Especially at the border of the far-vision portion, regions of over-correction exceeding −1.00 diopter also extend, and hence a progressive-power multifocal lens is provided which has a very narrow distinct-vision range over which objects can be seen at a long distance. Moreover, in the side regions of the intermediate portion, too, the additional power which should originally be added is so small that regions of negative over-correction extend.

Figure 6:
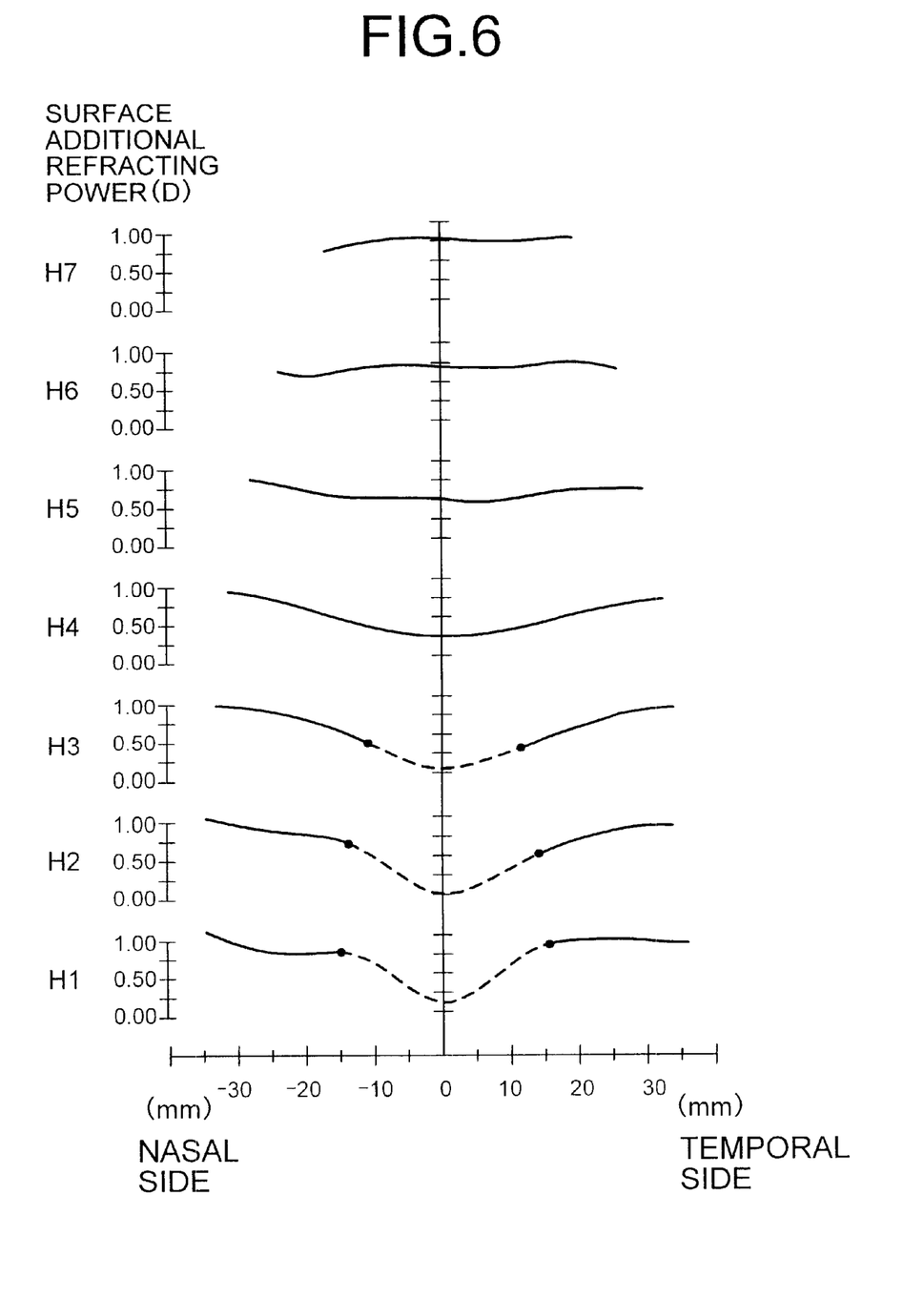
FIG. 6 shows surface additional refracting power distribution along horizontal section curves H1 to H7 at the far-vision portion of a progressive-power multifocal lens according to an embodiment of the present invention.

FIG. 6 shows surface additional refracting power distribution along horizontal section curves H1 to H7 at the far-vision portion of the progressive-power multifocal lens according to the present embodiment. In FIG. 6, the abscissa presents distance x (mm) in the horizontal direction from the principal meridian curve in wear of spectacles. The distance x in the horizontal direction has numerals with positive signs on the temporal side and numerals with negative signs on the nasal side. Also, the surface additional refracting power along the horizontal section curves H1 to H7 is indicated in units D (diopter). The part of solid lines in the surface additional refracting power distribution shows the region that satisfies $15 \leq (x^2+y^2)^{1/2}$ (mm). Also, the part of broken lines in the surface additional refracting power distribution shows the region that satisfies $(x^2+y^2)^{1/2} < 15$ (mm).

The progressive-power multifocal lens according to the present embodiment has, like the comparative example, an external diameter φ of 70 mm, a base curve BC of 2.00 diopters, a far-vision portion dioptric power Df of −2.50 diopter, an additional power Ad of 2.00 diopters and a lens refractive index ne of 1.67, where the far-vision portion eyepoint E is positioned 2 mm upward from the geometrical center OG of the lens, and the center of far-vision portion, OF, is positioned 8 mm upward from the geometrical center OG of the lens.

As can be seen from FIG. 6, the progressive-power multifocal lens according to the present embodiment fulfills the condition of the following condition (1) in the region which satisfies $15 \leq (x^2+y^2)^{1/2} \leq 20$ in the far-vision portion.

$$\Delta P(x,y) > 0 \qquad (1)$$

Figure 7:
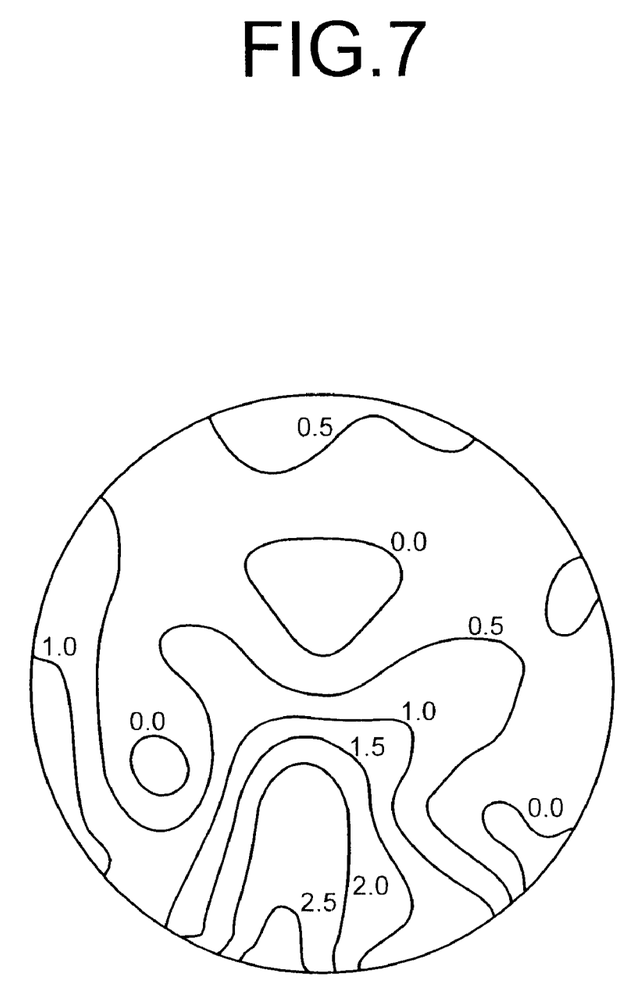
FIG. 7 shows surface additional dioptric power distribution in respect of light rays passing through a progressive-power multifocal lens according to the embodiment of the present invention.

FIG. 7 shows surface additional dioptric power distribution in respect of light rays passing through the progressive-power multifocal lens according to the present embodiment. As can be seen from FIG. 5 and FIG. 7 in comparison, regions in which the absolute values of the additional dioptric power at the far-vision portion are not greater than 0.50 diopter stand improved very widely compared with the comparative example, and hence a progressive-power multifocal lens is provided which has a very wide distinct-vision range in the dioptric power.

With regard to the condition (2), its corresponding values are inspected with reference to Table 1 shown below.

TABLE 1

|  | H1 | H2 | H3 | H4 | H5 | H6 | H7 |
|---|---|---|---|---|---|---|---|
| -35 | 0.031 | 0.028 | | | | | |
| -30 | 0.031 | 0.030 | 0.028 | 0.025 | | | |
| -25 | 0.032 | 0.033 | 0.030 | 0.026 | 0.022 | 0.017 | |
| -20 | 0.041 | 0.039 | 0.032 | 0.024 | 0.021 | 0.017 | |
| -15 | 0.054 | 0.045 | 0.031 | 0.023 | 0.021 | 0.021 | 0.020 |
| -10 | | | | 0.020 | 0.023 | 0.026 | 0.025 |
| -5 | | | | 0.016 | 0.025 | 0.029 | 0.028 |
| 0 | | | | 0.016 | 0.025 | 0.028 | 0.026 |
| 5 | | | | 0.018 | 0.023 | 0.025 | 0.024 |
| 10 | | | | 0.021 | 0.023 | 0.024 | 0.023 |
| 15 | 0.060 | 0.037 | 0.027 | 0.023 | 0.024 | 0.024 | 0.023 |
| 20 | 0.049 | 0.035 | 0.028 | 0.024 | 0.022 | 0.021 | |
| 25 | 0.038 | 0.033 | 0.029 | 0.024 | 0.020 | 0.017 | |
| 30 | 0.032 | 0.030 | 0.027 | 0.023 | | | |
| 35 | 0.027 | 0.025 | | | | | |

As can be seen from Table 1 shown above, the progressive-power multifocal lens according to the present embodiment fulfills the following condition (2) in the region that satisfies $15 \leq (x^2+y^2)^{1/2} \leq 20$ in the far-vision portion.

$$0.005 \leq \Delta P(x,y)/(x^2+y^2)^{1/2} \leq 0.120 \qquad (2)$$

Incidentally, without limitations to the embodiment described above, it is apparent that the present invention is applicable to progressive-power multifocal lenses having a variety in specification and materials.

As described above, according to the present invention, in progressive-power multifocal lenses whose far-vision portion dioptric power is minus, a progressive-power multifocal lens can be materialized in which the level of deviation of dioptric power, i.e., the dioptric-power error, from far-vision portion dioptric power at the far-vision portion can be controlled to a small value over a wide range and the optical performance in wear of spectacles can be set well. Also, especially in the far-vision portion, a wide distinct-vision range can be ensured in which any blur of views due to a dioptric-power error may less occur.

What is claimed is:

1. A progressive-power multifocal lens whose far-vision portion dioptric power is minus, which comprises, along a principal meridian curve which divides the refracting surface of the lens into a nasal-side portion and a temporal-side portion;

a far-vision correction portion which deals with a long distance;

a near-vision correction portion which deals with a short distance; and a progressive-power portion which connects the refracting power continuously between the far-vision correction portion and the near-vision correction portion at the surfaces of the both portions;

wherein;

where a base curve is represented by BC; a mean surface refracting power at an arbitrary point on the progressive-power multifocal surface, located at a distance of x (mm) from a far-vision portion eyepoint in the horizontal direction in wear of spectacles and located at a distance of y (mm) from the far-vision portion eyepoint in the vertical direction in wear of spectacles, by P (x,y) (diopter); and a mean surface additional refracting power obtained by subtracting the base curve BC from the mean surface refracting power, by $\Delta P(x,y)\{=P(x,y)-BC\}$ (diopter);

the lens fulfills the condition of $$\Delta P(x,y) > 0 \qquad (1)$$

in a region which satisfies $15 \leq (x^2+y^2)^{1/2} \leq 20$ in the far-vision correction portion.

2. The progressive-power multifocal lens according to claim 1, which fulfills the condition of $$0.005 \leq \Delta P(x,y)/(x^2+y^2)^{1/2} \leq 0.120 \qquad (2)$$

in a region which satisfies $15 \leq (x^2+y^2)^{1/2} \leq 20$ in the far-vision correction portion.

* * * * *